United States Patent
Zeinali Zadeh Ranjhbar Ranjbar

(10) Patent No.: US 10,761,614 B2
(45) Date of Patent: Sep. 1, 2020

(54) ENHANCED CONTEXT-BASED COMMAND LINE INTERFACE AUTO-COMPLETION USING MULTIPLE COMMAND MATCHING CONDITIONS

(71) Applicant: Fortinet, Inc., Sunnyvale, CA (US)

(72) Inventor: Mohammad Mehdi Zeinali Zadeh Ranjhbar Ranjbar, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 128 days.

(21) Appl. No.: 16/007,114

(22) Filed: Jun. 13, 2018

(65) Prior Publication Data
US 2019/0384415 A1    Dec. 19, 2019

(51) Int. Cl.
    G06F 3/048    (2013.01)
    G06F 9/455    (2018.01)
    G06F 3/023    (2006.01)
    G06F 16/33    (2019.01)
    G06F 40/274   (2020.01)

(52) U.S. Cl.
    CPC ........ G06F 3/0237 (2013.01); G06F 9/45512 (2013.01); G06F 16/3334 (2019.01); G06F 40/274 (2020.01)

(58) Field of Classification Search
    CPC . G06F 3/00; G06F 3/048; G06F 17/00; G06F 11/00; G06F 3/0237; G06F 9/455; G06F 16/33; G06F 40/274
    See application file for complete search history.

(56) References Cited

U.S. PATENT DOCUMENTS

| | | | |
|---|---|---|---|
| 9,722,879 B1* | 8/2017 | Muthu | H04L 67/1097 |
| 2004/0117380 A1* | 6/2004 | Perrow | G06F 3/0237 |
| 2006/0190579 A1* | 8/2006 | Rachniowski | G06F 9/45512 709/223 |
| 2008/0155565 A1* | 6/2008 | Poduri | G06F 9/453 719/320 |
| 2008/0208853 A1* | 8/2008 | Visnnans | H04L 29/12594 |

(Continued)

OTHER PUBLICATIONS

Fortinet "FortiOS 5.63 CLI Reference." Version 5.63. Dec. 22, 2017. 1536 pgs.
FortiOS 5.6.3 CLI Reference. Version 5.6.3. Fortinet. 1536 pgs.

*Primary Examiner* — Hugo Molina
(74) *Attorney, Agent, or Firm* — Jaffery Watson Mendonsa & Hamilton LLP

(57) ABSTRACT

Systems and methods for improved command line interface (CLI) auto-completion. According to one embodiment, a command auto-complete assistant running on a network security device receives input text entered by a user via a command line interface (CLI) console associated with the network security device. A list of auto-complete suggestions is determined by the command auto-complete assistant by matching the input text with multiple commands of a command set based on a matching condition. A score is calculated by the command auto-complete assistant for each auto-complete suggestion in the list of auto-complete suggestions based on at least one priority weighting factor. The list of auto-complete suggestions is sorted by the command auto-complete assistant based on their respective scores. At least one of the sorted auto-complete suggestions is displaying by the command auto-complete assistant on the CLI console.

24 Claims, 3 Drawing Sheets

(56) References Cited

U.S. PATENT DOCUMENTS

| | | | | |
|---|---|---|---|---|
| 2009/0254882 A1* | 10/2009 | Ruellan | ............... | H03M 7/30 |
| | | | | 717/120 |
| 2011/0219202 A1* | 9/2011 | Bartsch | ............. | G06F 3/0659 |
| | | | | 711/163 |
| 2012/0192096 A1* | 7/2012 | Bowman | ............ | G06F 3/0481 |
| | | | | 715/780 |
| 2013/0080514 A1* | 3/2013 | Gupta | ................. | H04L 41/08 |
| | | | | 709/203 |
| 2014/0096066 A1* | 4/2014 | Auvenshine | ..... | G06F 9/45512 |
| | | | | 715/780 |
| 2016/0335246 A1* | 11/2016 | Wright | ............. | G06F 16/9535 |
| 2017/0109356 A1* | 4/2017 | Sawal | ............. | G06F 16/3322 |

* cited by examiner

ENHANCED CONTEXT-BASED COMMAND LINE INTERFACE AUTO-COMPLETION USING MULTIPLE COMMAND MATCHING CONDITIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to the field of computer operating systems. In particular, various embodiments relate to auto-completion of command inputs within a command line interface (CLI) of an operating system.

Description of the Related Art

A Command line interface (CLI) is a traditional user interface for computer operating systems. It is also the main interface typically used by more technical people when they operate or interact with a computing device having a dedicated operating system, for example, the FORTIOS operating system for network security devices, which is available from the assignee of the present invention. Using a CLI console, a user may enter commands and cause the commands to be executed by the operating system. An operating system may have a complicated command set and some commands may contain multiple optional arguments. Users may be required to enter a long text string to run a command when the command has multiple arguments. To accelerate command input, command auto-completion has been introduced for some operating systems that allows a user to enter only some portion of a command and auto-complete the command by a command auto-complete assistant. For example, a user may enter "con forti" and enter the "?" key. The command auto-complete assistant may identify which system commands that start with "con", for example, "config" and also determine arguments of "config" that start with "forti". Continuing with the present example, a list of command suggestions that start with "config forti" may then be displayed on the CLI console for the user's reference. In another example, a user may enter "con forti" and press the "TAB" key. A matched suggestion may then be echoed on the CLI console. If the echoed command is what the user wanted, the user may run the command by pressing the "ENTER" key. If the suggestion echoed on the command line is not the one that the user intended, the user may press the "TAB" key to iterate through a list of additional auto-complete suggestions.

A command history is another helpful way for accelerating command input. A command auto-complete assistant may keep a command history that includes commands that have been entered or executed by a user. To select a command from the command history that is to be executed again, the user may press the "UPARROW" or "DOWNARROW" keys to scan backward or forward in time through the command history.

Traditional auto-completion approaches match prefixes of commands with entered text and supply suggestions in alphabetical order when there are multiple matches. This type of auto-completion approach does not save much typing for commands having long keywords. The following endpoint-control profile setting entered via a CLI console illustrates the problem:

```
config endpoint-control profile
    edit "default"
        config forticlient-winmac-settings
            set forticlient-registration-compliance-action warning
            set forticlient-security-posture enable
            set forticlient-security-posture-compliance-action warning
            set forticlient-av enable
            set av-realtime-protection enable
            set av-signature-up-to-date disable
            set sandbox-analysis disable
            set os-av-software-installed disable
            set forticlient-application-firewall disable
            set forticlient-wf disable
            set forticlient-system-compliance enable
            set forticlient-system-compliance-action warning
            set forticlient-minimum-software-version disable
            set forticlient-log-upload enable
            set forticlient-log-upload-level traffic vulnerability event
            set forticlient-log-upload-server "172.17.61.97"
            set forticlient-vuln-scan enable
            set forticlient-vuln-scan-compliance-action warning
            set forticlient-vuln-scan-enforce high
            set forticlient-vuln-scan-enforce-grace 1
            set forticlient-vuln-scan-exempt disable
        end
        config forticlient-android-settings
            set forticlient-wf disable
            set disable-wf-when-protected enable
            set forticlient-vpn-provisioning disable
        end
        config forticlient-ios-settings
            set forticlient-wf disable
            set disable-wf-when-protected enable
            set client-vpn-provisioning disable
            set distribute-configuration-profile disable
        end
        set description "
        set replacemsg-override-group "
    next
end
```

In the above example, setting attributes in forticlient-winmac-settings that are prefixed with "forticlient-" is time consuming via the CLI console because the user has to type "forticlient-" and after that type one or two characters to narrow down the scope within the suggestions provided by the current auto-complete approach. Under the current approach, if a user wants to set "forticlient-vuln-scan-enforce" via the CLI console, the user should type "forticlient-v" and then the auto-complete options will be narrowed down to five options. The auto-complete here is not very helpful because the user has to must still enter a large part of the command before the auto-complete assistant can provide the user with useful auto-complete suggestions. Therefore, there is a need for an enhanced command line auto-completion methodology that can increase user efficiency by reducing typing required to be performed by the user.

SUMMARY

Systems and methods are described for improved command line interface (CLI) auto-completion. According to one embodiment, a command auto-complete assistant running on a network security device receives input text entered by a user via a command line interface (CLI) console associated with the network security device. A list of auto-complete suggestions is determined by the command auto-complete assistant by matching the input text with multiple commands of a command set based on a matching condition. A score is calculated by the command auto-complete assistant for each auto-complete suggestion in the list of auto-complete suggestions based on at least one priority weighting factor. The list of auto-complete suggestions is sorted by the command auto-complete assistant based on their respective scores. At least one of the sorted auto-complete suggestions is displaying by the command auto-complete assistant on the CLI console.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
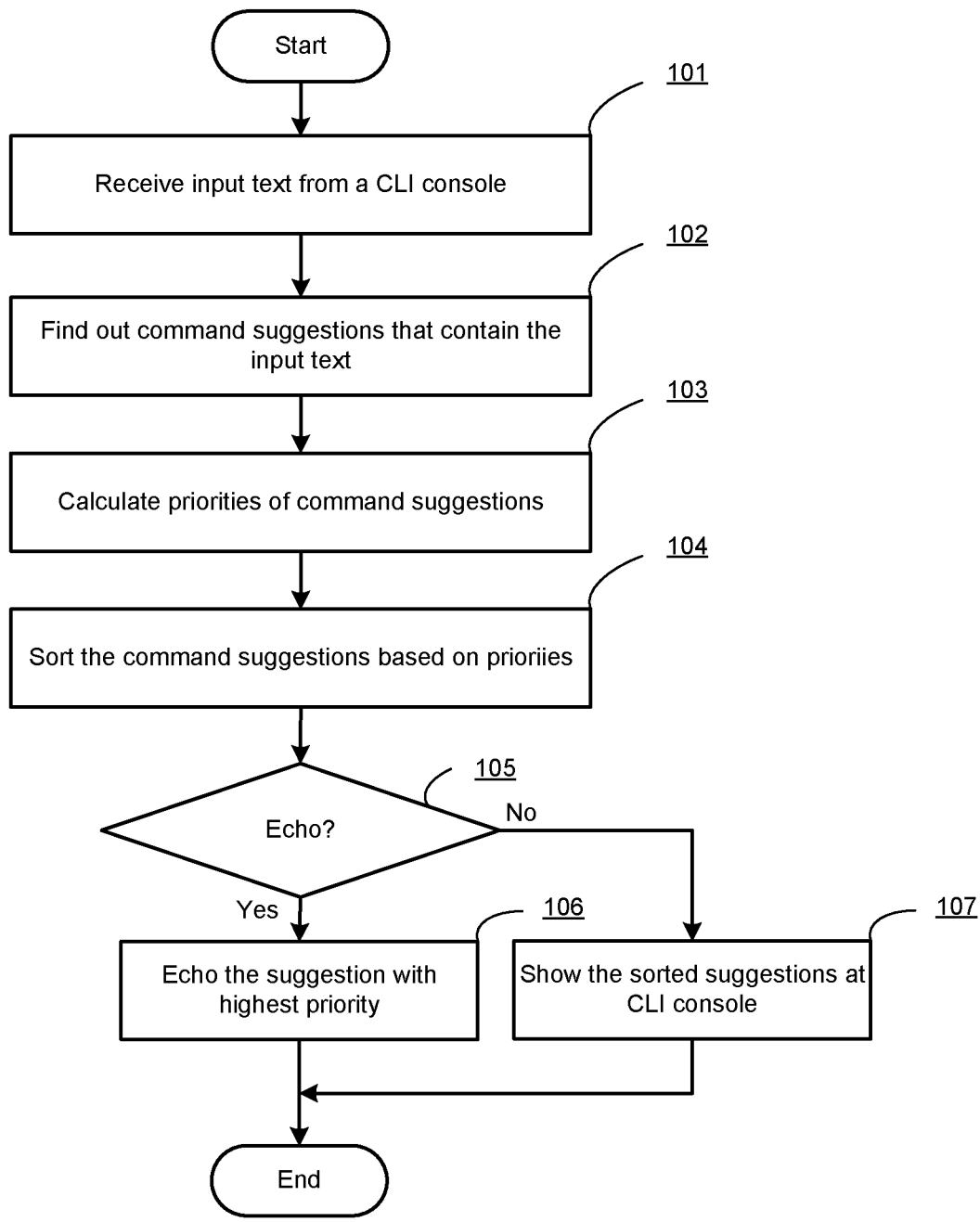
FIG. 1 is a flow diagram illustrating a method for CLI auto-complete in accordance with an embodiment of the present invention.

Systems and methods are described for improved command line interface (CLI) auto-completion. According to one embodiment, a command auto-complete assistant receives input text entered by a user via a CLI console and matches the input text with a command set based on a matching condition to retrieve auto-complete suggestions based on the matching conditions. The command auto-complete assistant further calculates scores for the auto-complete suggestions based on at least one priority weighting factor and sorts the auto-complete suggestions based on the scores. The sorted auto-complete suggestions are then displayed to the user via the CLI console.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 is a flow diagram illustrating a method for CLI auto-completion in accordance with an embodiment of the present invention.

At block 101, an auto-completion assistant receives input text are entered by a user via a CLI console. A user may enter a sequence of words associated with a command and enter a special key to indicate the end of the command input. For example, the "ENTER" key may indicate that the command is a completed command and should be executed as normal. Alternatively, a "TAB", "?", "UP-ARROW" or "DOWN-ARROW" key may be indicative that the text entry input by the user is only a portion of the command and that an auto-completion process is to be executed by the auto-completion assistant.

At block 102, the auto-completion assistant checks a command set of a operating system based on the context of the input text and determines auto-complete suggestions that contain the input text. Each operating system has its own command set and each command of the command set may further comprises one or more arguments. For example, in the context of the FORTIOS operating system, the command set includes keywords that can be divided into multiple categories, for example, Commands (config, edit, . . . ), Objects (interface, user, . . . ), Nodes (system, endpoint-control, . . . ), Tables (wan1, default, . . . ) and Attributes (IP, mode, . . . ). A command is a sequence of Command, Object, Node, Table and Attribute that are collectively referred to as words by the auto-completion assistant.

In one example, the auto-completion assistant may extract each input word ($W_{short}$) of the input text and analyze the context of the input text. The auto-completion assistant may check the context of the input text and search auto-complete suggestions in the command set of the operating system based on the context. For example, if the input text is "f?", the "f" is the first word and should be a part of a Command. The auto-completion assistant retrieves Commands that contain "f" based on multiple matching conditions. If the input text is "set f?" (setSPACEf?"), the "f" is a word after a Command. Therefore, the auto-completion assistant determines completion suggestions beginning with 'f' from among all arguments of the "set" command. In this example, let W be a set of matched words:

```
W={
    forticlient-registration-compliance-action;
    forticlient-security-posture;
    forticlient-security-posture-compliance-action;
    forticlient-av;
    forticlient-application-firewall;
    forticlient-wf;
    forticlient-system-compliance;
    forticlient-system-compliance-action warning;
    forticlient-minimum-software-version;
    forticlient-log-upload;
    forticlient-log-upload-level;
    forticlient-log-upload-server;
    forticlient-vuln-scan;
    forticlient-vuln-scan-compliance-action;
    forticlient-vuln-scan-enforce;
    forticlient-vuln-scan-enforce-grace;
    forticlient-vuln-scan-exempt
}
```

The matching conditions of the auto-completion assistant may be configured by the user to adjust the set of matched words. The matching conditions may include one or more of prefix, substring and subsequence. If desired, the matching conditions may also include case sensitivity. In one embodiment, the matching may be fault-tolerant to compensate for misspellings in the input text.

At block 103, the auto-completion assistant calculates a score for each of the auto-complete suggestions. In embodiments of the present invention, more auto-complete suggestions may be generated by the auto-completion assistant because multiple matching conditions are used for finding candidates. The auto-completion assistant calculates a score for each auto-complete suggestion so that restrictively matched suggestions, for example, have higher priorities for being displayed to the user. The auto-completion assistant may also use statistical methods to determine the score to represent the likelihoods that these suggestions will actually be used by users.

For example, let $W_{short}$ represent the short word that is entered by the user and $W_{long}$ represents a word in the matched word set W. A function, score ($W_{long}$; $W_{short}$), may be used for determining how good of a match $W_{short}$ is for $W_{long}$. Also, assume that there is a maximum allowable score, $score_{max}$. The score ($W_{long}$; $W_{short}$) function may be defined by Table 1 as follows:

TABLE 1 score($W_{long}$; $W_{short}$) function

| Condition | Score |
|---|---|
| $W_{short}$ is exactly $W_{long}$ | 0 |
| $W_{short}$ is a prefix of $W_{long}$ | 1 |
| $W_{short}$ is a substring of $W_{long}$ | 2 |
| $W_{short}$ is a subsequence of $W_{long}$ | 3 |
| Otherwise | 4 |

Let $score_{max}$=3. So, if the auto-complete suggestions are sorted based on these scores, then the user has a variety of text string options that he/she may enter in order to access the desired word. For example, if a user wants to "set forticlient-vuln-scan," the user may simply type "ftcl-vu-sc" or in a more extreme case "-vu-sc." In either case, the auto-complete would reach the desired completed option.

It is clear to those skilled in the art that other score functions may be defined for calculating the priority of the matched words. The score function may define a score for each of the matching conditions and may also take into consideration word frequency for an operating system or command history of a user.

According to one embodiment, for a command input that comprises multiple words ($W_{short}$), the auto-completion assistant is based on a series of word completion functions referred to as F where F=(f_0, ..., f_(n−1)). Every f∈F has the following properties:
- f signature is f ($W_{long}$, $W_{short}$) where $W_{long}$ and $W_{short}$ are both strings.
- f returns an integer score value. A positive integer means that $W_{short}$ can be completed to $W_{short}$. False is for otherwise. The higher return value means a better match.
- For 0≤i≤j≤n−1, f_i ($W_{long}$, $W_{short}$)>0⇒f_j ($W_{long}$, $W_{short}$)>0. In other words, members of F are sorted from more restrictive to less restrictive.

At block 104, the set of matched words is sorted by the auto-completion assistant based on the scores that are calculated as above in order that strictly matched words or the most used words may be shown or used.

For example, input text "c fw ag?" may be split into short words and each short word is matched with corresponding keywords in a command set. The first short word "c" may be matched with commands that contain "c". Commands "config", "execute" and "sysctl" may be matched with the first short word "c". The score of word "config" is 1 according to the above score function score ($W_{long}$, $W_{short}$) as $W_{short}$"c" is a prefix of $W_{long}$ "config". The score of words "execute" and "sysctl" is 2 as $W_{short}$ "c" is a substring of $W_{long}$ "execute" and "sysctl". The first $W_{short}$ "c" is determined as command "config". Next, the second short word "fw" is matched with arguments of command "config". As the only matched argument is "firewall", $W_{short}$ "fw" is determined as an argument "firewall". For the third short word "ag", the auto-completion assistant searches arguments of command "config firewall" and gets a set of matched words:

```
W={
    addrgrp
    addrgrp6
    ipmacbinding
    shaping-policy
}
```

As the short word "ag" is a subsequence of all the long word in the set, each long word has a score of 3.

At block 105, the auto-completion assistant may check if a special character is entered by the user to determine whether the auto-complete suggestions should be echoed at the CLI console or not.

For example, if a "TAB" or arrow key is entered followed by a command input, it means that the user desires the (next) highest priority auto-completion suggestion for the command to be echoed on the command line. The process then continues with block 106.

At block 106, the auto-completion assistant may select the top one of the sorted set of matched words and echo it on the CLI console. For example, when the user entered "c fw agTAB", the auto-completion assistant echo "c fw addrgrp" on the CLI console. Optionally, the auto-completion assistant may echo the whole command that include all the auto-completed words of the entered words on the CLI console, for example, the auto-completion "config firewall addrgrp" may be echoed at the command line. If an auto-completed command that is echoed at the CLI console is the command what the user intend to be entered, the user may hit "ENTER" key to execute the command. If the current auto-completed command is not what the user wanted, the user may press the "TAB" key again to direct the auto-completion assistant to echo the next suggestion in the sorted list of auto-complete suggestions onto the CLI console. By continuing to press the "TAB" key, the user may go through the whole list of suggestions in order of priority.

If a command input is ended with a "UPARROW", the auto-completion assistant may search the user's command history for matched words or commands to the input. The matched words or commands may be sorted as described above and the first matched word or command may be echoed on the CLI console. For example, a user's command history may include the following:

```
# exe log disp
# c fw addrgrp
# ed addrgrp1
...
# set forticlient
...
# end
```

For the input command "eUPARROW", the matched command list in user's command history may include "exe log disp", "ed addrgrp1", "set forticlient" and "end". The highest priority auto-completion suggestion "exe log disp" may be echoed on the CLI console. If the current auto-completion is not what the user wanted, the user may press the "UPARROW"/"DOWNARROW" keys to go through the auto-completion list echoed on the CLI console.

In one embodiment, when the user enters a command ending with "?", the auto-completion is not to be echoed on the CLI console, but rather a list of auto-complete suggestions may be displayed on the CLI console for the user's reference. At block 107, for the entered text "c fw ag?", the auto-complete suggestions for "ag" may be displayed under the command line on the CLI console. An example of this auto-completion is as follows:

```
# c fw ag?
addrgrp
addrgrp6
ipmacbinding
shaping-policy
```

In another example, a description for each auto-complete suggestion may be displayed together with the suggestion to help the user understand the auto-completion options. An example of a list of auto-completion suggestions with descriptions for the command input "c fw ag?" for the FORTIOS command set is shown below:

```
# c fw ag?
addrgrp        - Configure IPv4 address groups.
addrgrp6       - Configure IPv6 address groups.
Ipmacbinding   - Configure IP MAC bindings.
shaping-policy - Configure shaping policies.
```

Those skilled in the art will appreciate that additional optional features may be implemented in various embodiments of the present invention. For example, if word completion is not successful, then the auto-completion assistant may not output any completions and instead a parse error may be thrown.

In another example, in the case that the auto-completion assistant returns a unique suggestion, the word currently being types may automatically be completed to reflect the matched word. One exception to this rule, may be when the $W_{short}$ represents a special category of the command keyword, for example, table name, the entered word may be treated literally without any completions.

Figure 2:
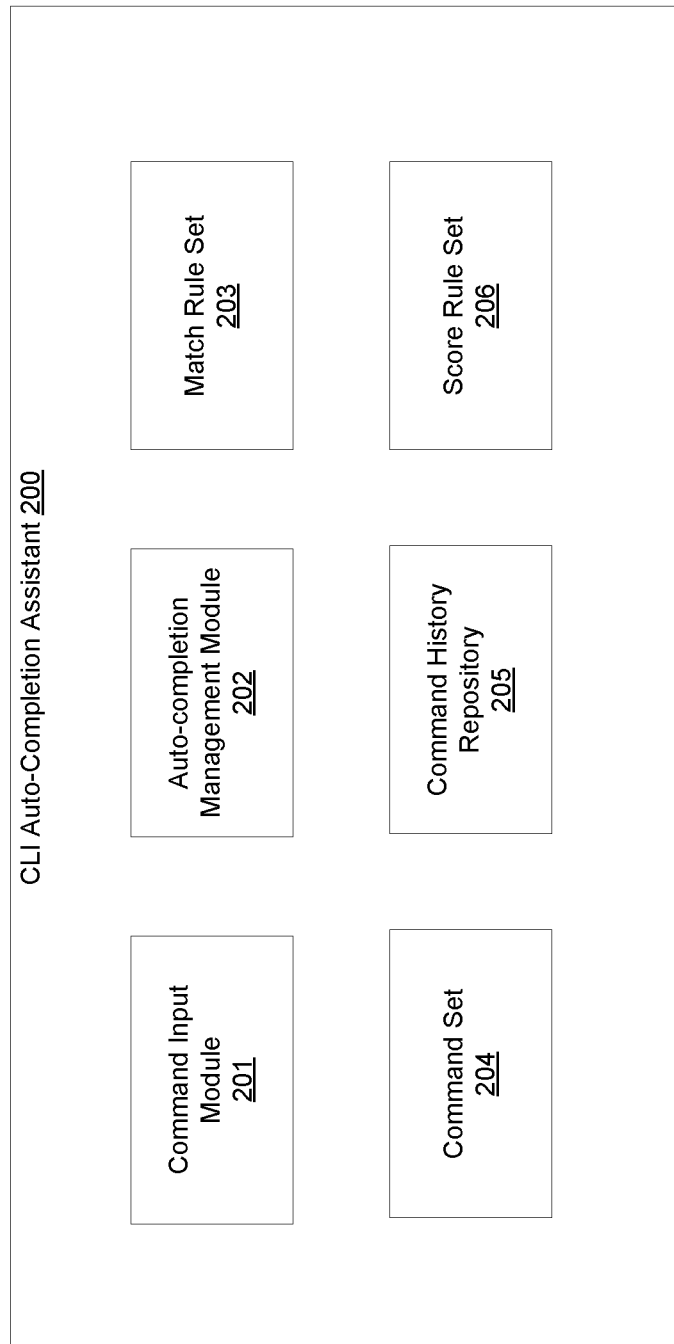
FIG. 2 illustrates exemplary functional units of a CLI console implementing improved command auto-completion in accordance with an embodiment of the present invention.

FIG. 2 illustrates exemplary functional units of a CLI auto-completion assistant 200 with command auto-completion in accordance with an embodiment of the present invention. CLI auto-completion assistant 200 comprises a command input module 201, an auto-completion management module 202, a match rule set 203, a command set 204, a command history repository 205 and a score rule set 206. In one embodiment, CLI auto-completion assistance 200 runs within an operating system (e.g., the FORTIOS operating system) of a network security device (e.g., one of the FORTIGATE family of network security appliances).

Command input module 201 is used for receiving input text entered by a user via a CLI console. The input text may include a part of a command or a part of a keyword. The input text may end with a special character that indicates how the input text is to be processed. For example, the "ENTER" key may indicate that the input text is a command to be executed. The "?" key may indicate that a list of commands that matches the input text is to be displayed. The "TAB" key may indicate that matched commands are to be iterated and echoed on the CLI console. The "ARROW" keys may indicate that matched commands in the user's command history are to be iterated and echoed on the CLI console.

Command set 204 is used for storing words or keywords ($W_{long}$) of the command set of an operating system. The words may be commands and arguments and can be classified into categories, such as Commands, Objects, Nodes, Tables, Attributes and etc. Those skilled in the art will appreciate that keywords and categories of the keywords may be different for different operating systems. For purposes of illustration, information regarding version 5.6.3 of the FORTIOS operating system command set can be found at https://docs.fortinet.com/d/fortigate-fortios-5.6-cli-reference, which is hereby incorporated by reference in its entirety for all purposes.

Auto-completion management module 202 is used for identifying auto-completions for the input text received by command input module 201 and displaying the auto-completions as required by the user. Auto-completion management module 202 may split the input text into words ($W_{short}$) separated by delimiter, such as a space, and match each $W_{short}$ with keywords ($W_{long}$) in command set 204 based on the context of the input $W_{long}$ text. For example, the first input word ($W_{short}$) may be considered a part of a Command and auto-completion management module 202 matches the $W_{short}$ with keywords of Commands in command set 204. The second and subsequent input words may be keywords associated with Objects, Nodes, Tables and Attributes of the first Command keyword. Auto-completion management module 202 may match the second and subsequent input words with corresponding categories of keywords in command set 204.

Match rule set 203 is used for storing matching rules that define how the input words ($W_{short}$) are matched with keywords ($W_{long}$) of command set 204. For example, the matching rules may include "prefix matching", "substring matching", "subsequence matching" and "case sensitiveness". A matching rule may be defined for each category of keywords. For example, for Command keywords, only "prefix matching" and "substring matching" may be used for matching a first input word with Command keys. For Object and Nodes keywords, "prefix matching", "substring matching" and "subsequence matching" may be used for matching corresponding input words. A matching rule may be defined to exclude a category of keywords from auto-completion. For example, the "table name" keywords may be excluded from auto-completion matching and the input word that corresponding to "table name" may be treated literally without any completions. In such a situation, the user would be required to input whole text of a table name when entering a command that includes a table. Match rule set 203 may be configured by a user to adapt to different operating systems or user requirements.

Auto-completion management module 202 matches an input word with keywords in command set 204 in accordance with match rules of match rule set 203 and obtains a list of auto-completion suggestions that comprise whole keywords that contain the input word. Then, a score is calculated for each auto-completion suggestion that represents how well the input word matches with the auto-completion suggestion or the possibility that the auto-completion suggestion is what the user intended. Score rule set 206 defines the rules or algorithms when an input word ($W_{short}$) and an auto-completion suggestion ($W_{long}$) are given. For example, "exact matching" of $W_{short}$ and $W_{long}$ may be given a highest priority while a "subsequence matching" of $W_{short}$ and $W_{long}$ may be given a lowest priority. The score rules may include and/or take into consideration other statistical information or user command history. For example, if an auto-completion suggestion is in the user's command history, it may be give a higher priority over other suggestions that are not present in the user's command history. In another example, a server may collect auto-completion histories and command histories of users within a given private network or across multiple private networks. The server may give a score to a $W_{short}/W_{long}$ combination by counting this combination in the auto-completion histories and command histories of the users. The scores of $W_{short}/W_{long}$ combination may be distributed to the users in order that auto-completion management module 202 may provide better matched auto-completion suggestions.

After scores of the auto-completion suggestions are calculated, the list of auto-completion suggestions may be sorted according to the scores. If a threshold score is defined in score rule set 206, the auto-completion suggestions whose scores exceed the threshold may be thrown out. If the user is doing history searching, only auto-completion suggestions that exist in user history repository 205 are kept in the list.

After the list of auto-completion suggestions is sorted, the list may be displayed on command input module 201. The whole list may be displayed if the user is asking for help by entering the "?" key. The top one in the list may be echoed on command input module 201 when the user is asking for auto-completion suggestion by pressing the "TAB" or the "ARROW" key. The list of auto-completion suggestions may be iterated if the user enters the "TAB" or "ARROW" key again.

Figure 3:
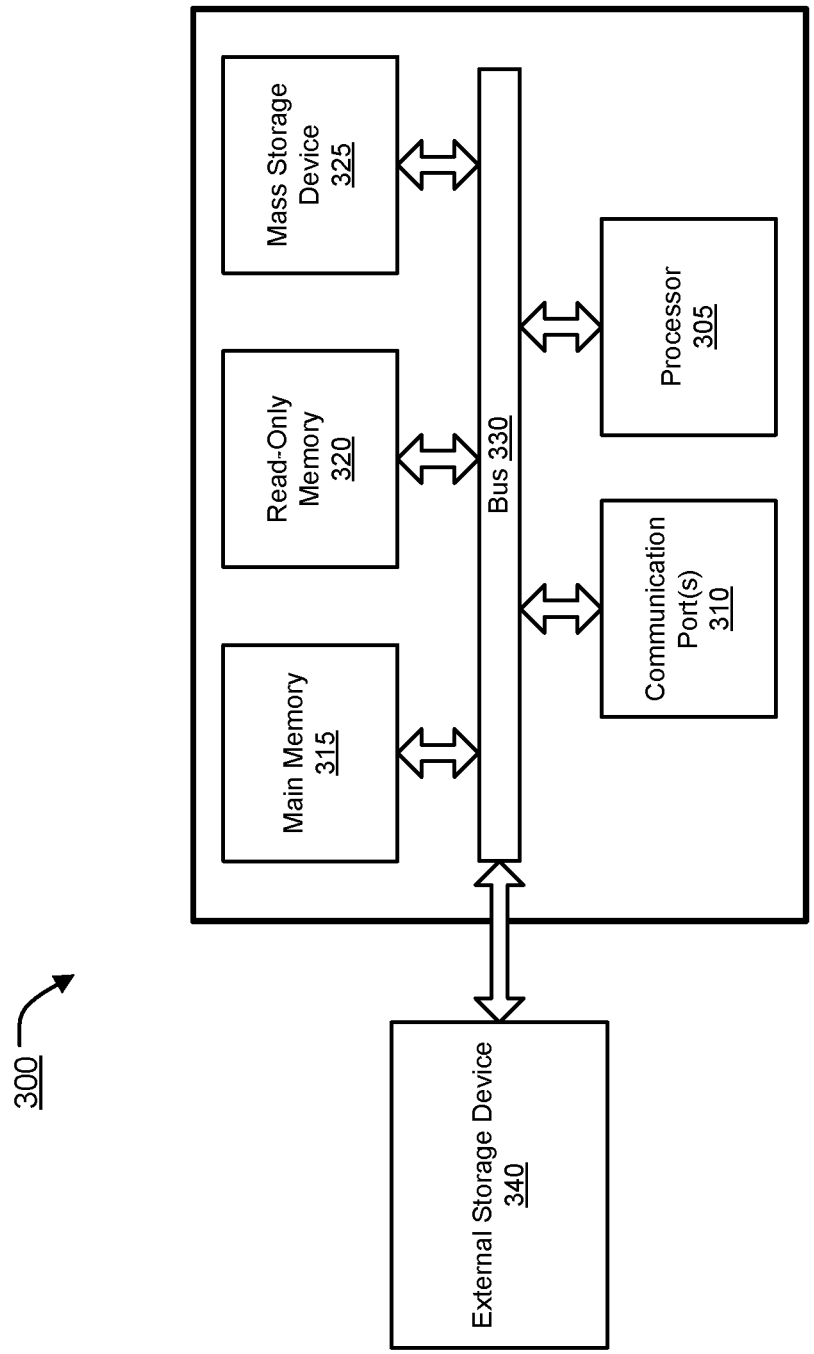
FIG. 3 is an exemplary computer system in which or with which embodiments of the present invention may be utilized.

FIG. 3 is an example of a computer system 300 with which embodiments of the present disclosure may be utilized. Computer system 300 may represent or form a part of a security device, a network appliance, a server or a client workstation running an operating system having a CLI console.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 300 includes a bus 330, a processor 305, communication port 310, a main memory 315, a removable storage media 340, a read only memory 320 and a mass storage 325. A person skilled in the art will appreciate that computer system 300 may include more than one processor and communication ports.

Examples of processor 305 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 305 may include various modules associated with embodiments of the present invention.

Communication port 310 can be any of an RS-232 port for use with a modem based dialup connection, a 10/100 Ethernet port, a Gigabit or 10 Gigabit port using copper or fiber, a serial port, a parallel port, or other existing or future ports. Communication port 310 may be chosen depending on a network, such a Local Area Network (LAN), Wide Area Network (WAN), or any network to which computer system 300 connects.

Memory 315 can be Random Access Memory (RAM), or any other dynamic storage device commonly known in the art. Read only memory 320 can be any static storage device(s) such as, but not limited to, a Programmable Read Only Memory (PROM) chips for storing static information such as start-up or BIOS instructions for processor 305.

Mass storage 325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 330 communicatively couples processor(s) 305 with the other memory, storage and communication blocks. Bus 330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 305 to system memory.

Optionally, operator and administrative interfaces, such as a display, keyboard, and a cursor control device, may also be coupled to bus 330 to support direct operator interaction with computer system 300. Other operator and administrative interfaces can be provided through network connections connected through communication port 310.

Removable storage media 340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a command auto-complete assistant running on a network security device, input text entered by a user via a command line interface (CLI) console associated with the network security device;
   splitting, by the command auto-complete assistant, the input text into a command portion and an argument portion;
   determining, by the command auto-complete assistant, a presumed command phrase of a command set by:

for each command phrase of a plurality of command phrases of the command set, calculating a command match score for the command phrase with respect to the command portion based on a plurality of command matching conditions; and setting the presumed command phrase to a command phrase for which the command match score is indicative of a best match to the command portion;

determining, by the command auto-complete assistant, a list of auto-complete suggestions by matching the argument portion with a plurality of argument keywords in the command set for the presumed command phrase based on a matching condition;

calculating, by the command auto-complete assistant, a score for each auto-complete suggestion in the list of auto-complete suggestions based on at least one priority weighting factor;

sorting, by the command auto-complete assistant, the list of auto-complete suggestions based on their respective scores; and displaying, by the command auto-complete assistant, at least one of the sorted auto-complete suggestions on the CLI console.

2. The method of claim 1, wherein the command set includes one or more of a command set of an operating system of the network security device and a command history of the user reflecting past interactions of the user with the operating system via the CLI console.

3. The method of claim 1, wherein the matching condition includes one or more of:

the argument portion is a prefix of an argument keyword of the plurality of argument keywords;

the argument portion is a substring of the argument keyword; and the argument portion is a subsequence of the argument keyword.

4. The method of claim 1, wherein the at least one priority weighting factor includes one or more of:

the argument portion is an exact match of an argument keyword of the plurality of argument keywords;

the argument portion is a prefix of the argument keyword;

the argument portion is a substring of the argument keyword;

the argument portion is a subsequence of the argument keyword;

the argument portion is in a command history of the user, wherein the command history reflects past interactions of the user with an operating system of the network security device via the CLI console; and a usage frequency of the argument keyword relative to other argument keywords of the plurality of argument keywords.

5. The method of claim 1, further comprising:

receiving, by the command auto-complete assistant, a special character entered by the user via the CLI console; and determining, by the command auto-complete assistant, whether and how to display the auto-complete suggestions on the CLI console based on the special character.

6. The method of claim 5, further comprising:

echoing, by the command auto-complete assistant, a suggestion of the sorted auto-complete suggestions at the CLI console; and iterating, by the command auto-complete assistant, the sorted auto-complete suggestions at the CLI console if the special character is entered by the user.

7. The method of claim 5, further comprising displaying, by the command auto-complete assistant, a list of the sorted auto-complete suggestions via the CLI console.

8. The method of claim 1, wherein the plurality of command matching conditions include:

the command portion is a prefix of a command phrase of the plurality of command phrases;

the command portion is a sub string of the command phrase; and the command portion is a subsequence of the command phrase.

9. A non-transitory computer-readable storage medium embodying a set of instructions, which when executed by one or more processors of a network security device, cause the one or more processors to perform a method comprising:

receiving input text entered by a user via a command line interface (CLI) console associated with the network security device;

splitting the input text into a command portion and an argument portion;

determining a presumed command phrase of a command set by:

for each command phrase of a plurality of command phrases of the command set, calculating a command match score for the command phrase with respect to the command portion based on a plurality of command matching conditions; and setting the presumed command phrase to a command phrase for which the command match score is indicative of a best match to the command portion;

determining a list of auto-complete suggestions by matching the argument portion with a plurality of argument keywords in the command set for the presumed command phrase based on a matching condition;

calculating a score for each auto-complete suggestion in the list of auto-complete suggestions based on at least one priority weighting factor;

sorting the list of auto-complete suggestions based on their respective scores; and displaying at least one of the sorted auto-complete suggestions on the CLI console.

10. The non-transitory computer-readable storage medium of claim 9, wherein the command set includes one or more of a command set of an operating system of the network security device and a command history of the user reflecting past interactions of the user with the operating system via the CLI console.

11. The non-transitory computer-readable storage medium of claim 9, wherein the matching condition includes one or more of:

the argument portion is a prefix of an argument keyword of the plurality of argument keywords;

the argument portion is a substring of the argument keyword; and the argument portion is a subsequence of the argument keyword.

12. The non-transitory computer-readable storage medium of claim 9, wherein the at least one priority weighting factor includes one or more of:

the argument portion is an exact match of an argument keyword of the plurality of argument keywords;

the argument portion is a prefix of the argument keyword;

the argument portion is a substring of the argument keyword;

the argument portion is a subsequence of the argument keyword;

the argument portion is in a command history of the user, wherein the command history reflects past interactions of the user with an operating system of the network security device via the CLI console; and a usage frequency of the argument keyword relative to other argument keywords of the plurality of argument keywords.

13. The non-transitory computer-readable storage medium of claim 9, wherein the method further comprises:

Receiving a special character entered by the user via the CLI console; and

Determining whether and how to display the auto-complete suggestions on the CLI console based on the special character.

14. The non-transitory computer-readable storage medium of claim 13, wherein the method further comprises:

echoing a suggestion of the sorted auto-complete suggestions at the CLI console; and iterating the sorted auto-complete suggestions at the CLI console if the special character is entered by the user.

15. The non-transitory computer-readable storage medium of claim 13, wherein the method further comprises displaying a list of the sorted auto-complete suggestions via the CLI console.

16. The non-transitory computer-readable storage medium of claim 9, wherein the plurality of command matching conditions include:

the command portion is a prefix of a command phrase of the plurality of command phrases;

the command portion is a sub string of the command phrase; and the command portion is a subsequence of the command phrase.

17. A network security device comprising:

a processing resource; and a non-transitory computer-readable medium, coupled to the processing resource, having stored therein instructions that when executed by the processing resource cause the processing resource to perform a method comprising:

receiving input text entered by a user via a command line interface (CLI) console associated with the network security device;

splitting the input text into a command portion and an argument portion;

determining a presumed command phrase of a command set by:

for each command phrase of a plurality of command phrases of the command set, calculating a command match score for the command phrase with respect to the command portion based on a plurality of command matching conditions; and setting the presumed command phrase to a command phrase for which the command match score is indicative of a best match to the command portion;

determining a list of auto-complete suggestions by matching the argument portion with a plurality of argument keywords in the command set for the presumed command phrase based on a matching condition;

calculating a score for each auto-complete suggestion in the list of auto-complete suggestions based on at least one priority weighting factor;

sorting the list of auto-complete suggestions based on their respective scores; and displaying at least one of the sorted auto-complete suggestions on the CLI console.

18. The system of claim 17, wherein the command set includes one or more of a command set of an operating system of the network security device and a command history of the user reflecting past interactions of the user with the operating system via the CLI console.

19. The system of claim 17, wherein the matching condition includes one or more of:

the argument portion is a prefix of an argument keyword of the plurality of argument keywords;

the argument portion is a substring of the argument keyword; and the argument portion is a subsequence of the argument keyword.

20. The system of claim 17, wherein the at least one priority weighting factor includes one or more of:

the argument portion is an exact match of an argument keyword of the plurality of argument keywords;

the argument portion is a prefix of the argument keyword;

the argument portion is a substring of the argument keyword;

the argument portion is a subsequence of the argument keyword;

the argument portion is in a command history of the user, wherein the command history reflects past interactions of the user with an operating system of the network security device via the CLI console; and a usage frequency of the argument keyword relative to other argument keywords of the plurality of argument keywords.

21. The system of claim 17, wherein the method further comprises:

Receiving a special character entered by the user via the CLI console; and

Determining whether and how to display the auto-complete suggestions on the CLI console based on the special character.

22. The system of claim 21, wherein the method further comprises:

echoing a suggestion of the sorted auto-complete suggestions at the CLI console; and iterating the sorted auto-complete suggestions at the CLI console if the special character is entered by the user.

23. The system of claim 21, wherein the method further comprises displaying a list of the sorted auto-complete suggestions via the CLI console.

24. The system of claim 17, wherein the plurality of command matching conditions include:

the command portion is a prefix of a command phrase of the plurality of command phrases;

the command portion is a substring of the command phrase; and the command portion is a subsequence of the command phrase.

* * * * *